United States Patent [19]

Lin et al.

[11] 4,315,198
[45] Feb. 9, 1982

[54] DIGITAL SERVO SYSTEM

[75] Inventors: Frank W. Lin, Los Altos Hills; Mei S. Sze, San Jose, both of Calif.

[73] Assignee: Qume Corporation, San Jose, Calif.

[21] Appl. No.: 91,931

[22] Filed: Nov. 7, 1979

[51] Int. Cl.³ .............................................. G05B 11/18
[52] U.S. Cl. .................................... 318/594; 318/601
[58] Field of Search ............... 318/594, 592, 600, 601, 318/602, 569, 571, 603

[56] References Cited

U.S. PATENT DOCUMENTS

| | | | |
|---|---|---|---|
| 4,006,394 | 2/1977 | Cuda et al. | 318/603 X |
| 4,064,444 | 12/1977 | Hoang | 318/615 X |
| 4,119,958 | 10/1978 | Simon et al. | 318/604 X |
| 4,184,108 | 1/1980 | Sordello et al. | 318/594 X |
| 4,207,504 | 6/1980 | Kawada et al. | 318/616 X |

Primary Examiner—B. Dobeck
Attorney, Agent, or Firm—I. Keschner

[57] ABSTRACT

A digital servo system adapted for use in a dual mode coarse-fine servo system to control a movable member from a starting position to an at rest destination position. The digital servo generates a pulse train in response to varying space phase cyclic analog position signal A from an encoder coupled to the movable member. Each cycle of an analog position signal represents a small incremental amount of movement by the movable member. The pulse train provides a change in its state in time with the varying position signals. In the preferred embodiment, eight changes occur per cycle. The pulse train is integrated to provide a velocity signal which is compared with a command velocity signal.

14 Claims, 6 Drawing Figures

DIGITAL SERVO SYSTEM

BACKGROUND OF THE INVENTION

The present invention is directed to a digital servo system, and more particularly, a digital servo system for use in electro-mechanical systems requiring the rapid movement and precise position of a movable member. Such systems may include impact printers (including daisywheel impact printers), magnetic disk memories, and so forth. The present invention is described with reference to controlling the carriage of a printer but may also be used to control the movement of the printwheel of a daisywheel printer, the movement of a magnetic head in a disk memory and in other applications.

In the prior art, servo control systems employing predominately analog circuitry have been used to control the printwheel and carriage of a daisywheel printer and the arm mounting the magnetic pickup of a disk memory unit. For example, U.S. Pat. No. 3,696,354 teaches an analog servo control system for controlling the arm of a magnetic memory and U.S. Pat. Nos. 3,789,971 and 3,954,163 described the application of the aforementioned servo control system to printers having rotatable elements.

Of course, those skilled in the art will recognize that to accomplish high quality printing or to accurately position the arm of the magnetic disk memory, the servo signals of the servo system must be accurately controlled. In such servo systems, an encoder wheel, either electro-optically or electromagnetically, generates a pair of phase spaced cyclic analog position signals which are representative of the phase position of the movable member of the printer or magnetic memory. Each cycle in the analog position signal identifies a small increment of movement. As explained in the aforementioned patents, differentiation of such signals indicates the velocity of the movable member, which velocity is compared with a command velocity a closed loop servo control system during a coarse mode of operation. During a subsequent fine mode of operation, the differentiated position signal and cyclic position signal are feedback in the closed loop servo control system to electronically detent the movable member. In these prior art systems, the position and velocity signals are both amplitude and phase sensitive. To help compensate for such sensitivity, a floating reference threshhold signal was sometimes utilized in the generation of the command signal, as is described in U.S. Pat. No. 3,954,163. In the prior art, both the compensation and the generation of these servo signals was done using analog techniques. Of course, those skilled in the art will recognize that analog circuit techniques suffer from drift and therefore are prone to become misadjusted with the passage of time. Of course, digital circuit techniques are much less sensitive to drift and other factors tending to degrade system performance.

It was therefore one object of the present invention to provide an improved servo control system for controlling the movement of the printwheel and/or carriage of an impact printer or the arm of a magnetic memory.

It is yet another object of the present invention to provide a servo system having more digital circuitry than prior systems thereby reducing the need for analog compensation.

The foregoing objects are achieved as is now described. The digital servo system control the motion of a movable member along a path from a starting position to a destination position. The member is moved by a motor and is coupled to an encoder for generating at least two phase spaced cyclic analog position signals representative of the instantaneous position of the movable member. The periods of these signals is indicative of the instantaneous velocity of the movable member. The two cyclic signals are digitized to provide digital signals which change state as the corresponding signal changes polarity. At least one of the cyclic signals is inverted. Comparisons are made between one of the cyclic signals and the inverted and non-inverted forms of the other cyclic signal in two comparators. These comparators provide additional digital signals which change state as the inputs become relatively more positive and/or negative with respect to each other. The outputs of the two digitizers are exclusively orred in a first exclusive OR circuit while the output of the two comparators are exclusively orred in a second exclusive OR circuit. The outputs of the two exclusive OR circuits are in turn exclusively orred providing a pulse train which changes state in time with the analog position signals. In fact, in the embodiment described, the pulse train changes state eight times through one complete cycle of one of the analog position signals and will accurately change state during each 45 degrees of phase change in such analog signal. The pulse train is preferably applied to a one-shot which is responsive to change of state in the pulse train for outputting a short pulse in response thereto. The output of the one-shot is a pulse train of constant width pulses whose leading edges occur at each 45 degrees of phase change in the analog position signal. The pulse train is coupled via a constant current source to an integrater circuit which provides an accurate velocity signal during coarse mode operation of the servo mechanism. The velocity signal derived from the pulse train is compared with a command velocity in an error generator, the output of which is used to drive the motor which moves the movable member. If a coarse-fine dual mode servo system is utilized, then the velocity comparision is made during the coarse (velocity) mode while the zero crossing of the analog position signal is used to electronically detent the movable member in the fine (position) mode.

BRIEF DESCRIPTION OF THE FIGURES

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying figures, wherein;

DETAILED DESCRIPTION OF THE INVENTION

Figure 1:
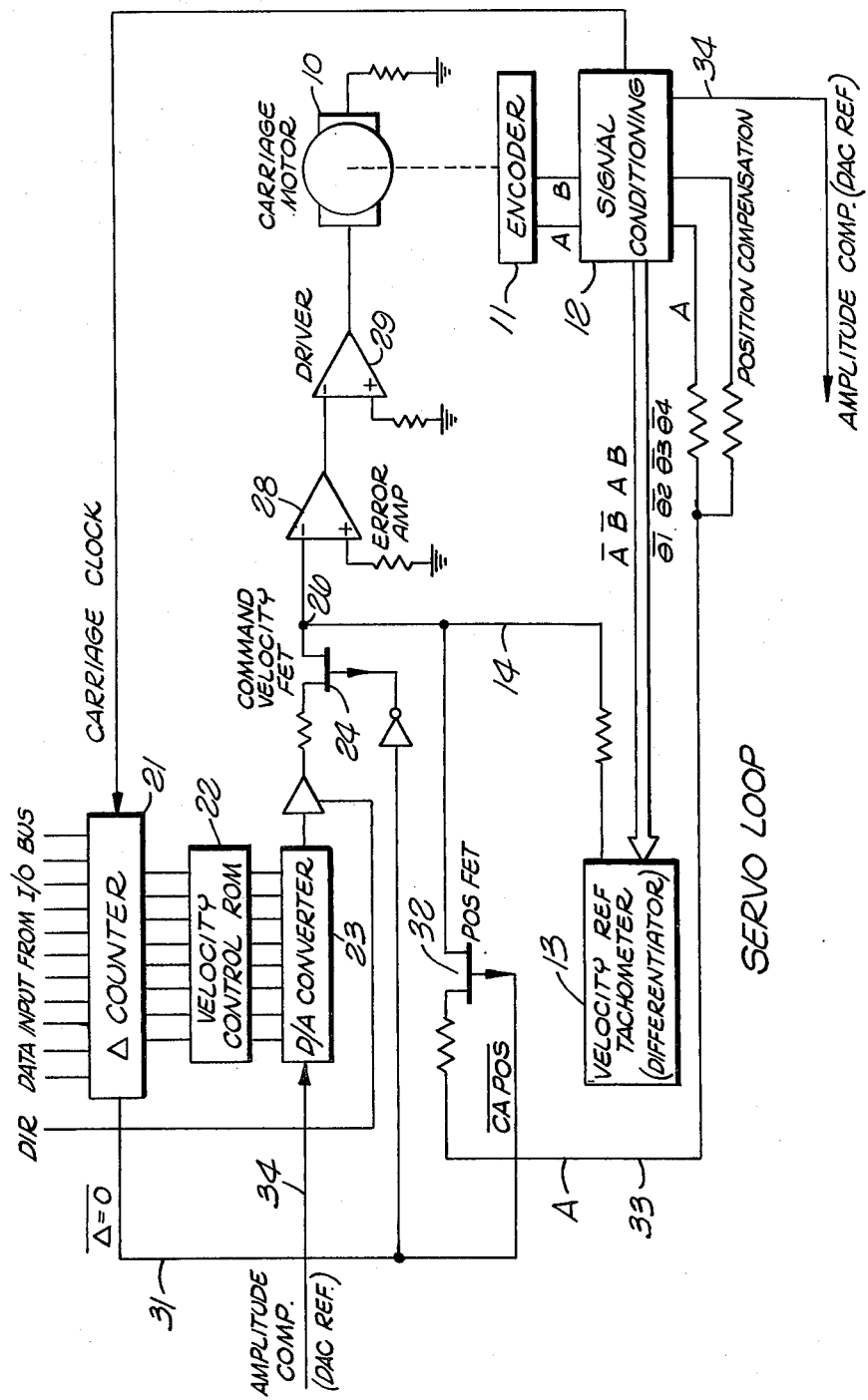
FIG. 1 is a block diagram of a prior art analog servo used for printers and magnetic memories.
Figure 4:
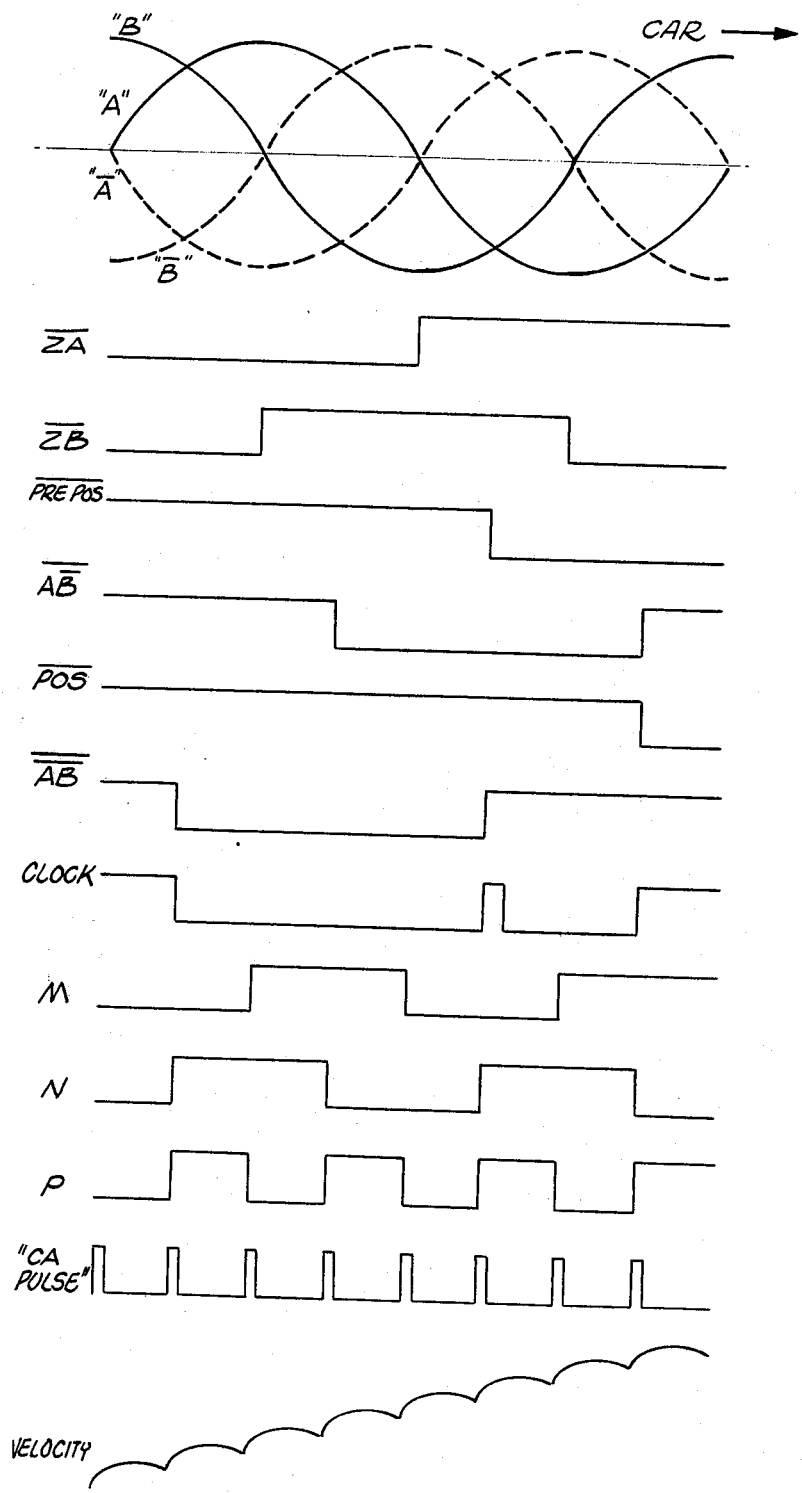
FIG. 4 is a timing diagram depicting various signal generated by the digital servo of FIGS. 2 and 3(a)-3(c).

FIG. 1 is a block diagram illustrative of closed loop servo systems used in prior art printers and magnetic disk memories. FIG. 1 illustrates the control of the carriage motor 10 for a rotary wheel printing system;

however, those skilled in the art will appreciate that this servo system has also been used to control the rotary daisywheel and the arm mounting the magnetic pickup head of a magnetic disk memory unit. An encoder 11, which is mechanically coupled to motor 10, generates a pair of phase spaced signals A and B. Signals A and B may be, for example, a pair of sinewaves spaced ninety degrees apart in phase, such as illustrated in FIG. 4. Such signals are conditioned in a signal conditioning unit 12 which, for example, may be a group of operational amplifiers to provide inverted signals $\overline{A}$ and $\overline{B}$ and associated timing signals $\overline{8}_1$ $8_2$, $\overline{8}_3$, $8_4$ based on peak and zero crossing times of signals A and B. Unit 12 also provides a clock signal for decrementing delta counter 21. These signals have been connected to a velocity reference tachometer 13 which differentiates the input signals A, B, $\overline{A}$ and $\overline{B}$ in accordance with the timing signals to provide a velocity reference signal on line 14 that represents the actual velocity of carriage motor 10.

The servo system of FIG. 1 is known as a dual mode servo and those skilled in the art will appreciate that this servo system is often also referred to as a coarse-fine servo system. In the coarse mode of operation the velocity signal from the velocity reference tachometer 13 is compared with a command velocity supplied via transistor 24 to error amplifier 28. Error amplifier 28 seeks to make the actual velocity of the motor follow the command velocity signal is disabled and an actual position signal, signal A, is applied to error amplifier 28 via a transistor 32 along with the velocity reference tachometer 13 output. The error amplifier 28 then seeks to position the motor such that signal A is at a zero crossing point, in effect, an electronic detent. Delta counter 21 controls how far the servo system moves the carriage. Encoder 11 outputs a complete sinusoidal signal for each small increment of movement by the carriage and the delta counter decrements by one each time a sinusoidal position signal changes by 360 degrees. Thus the delta counter at any given time indicates the number of increments of movement remaining for the carriage to reach its commanded position. When delta counter 21 reaches zero, the control signal $\Delta = 0$ on line 31 goes low turning on transistor 32 and turning off transistor 24, thereby switching the servo from its coarse to its fine mode of operation.

Delta counter 21 also serves the purpose of generating the command velocity used during the coarse mode. The command velocity is a function of the distance to be moved at any given time. This function is stored in the velocity control Read Only Memory (ROM) 22 which outputs a digital signal which is converted to analog by D/A converter 23 whose output is coupled to transistor 24.

In the coarse mode of operation the actual velocity of the carriage is compared to the desired velocity and upon reaching the commanded position, the servo system shifts to the fine mode of operation where it locks on the zero crossing point of the A signal to precisely position the carriage motor. The actual velocity feedback signal is preferably continued during the fine position mode for better stability. The output of the error amplifier 28 is provided to a driver amplifier 29 which drives the carriage motor 10.

An amplitude compensation signal on line 34 is produced by the signal conditioning unit 12. This signal is connected to the D/A converter 23 to compensate for amplitude and phase change in the A and B encoder 11 signals. This amplitude compensation requires analog circuitry, which, in essence, detects the peak amplitudes of the various A, B, $\overline{A}$, $\overline{B}$ encoder reference signals of the servo system.

Figure 2:
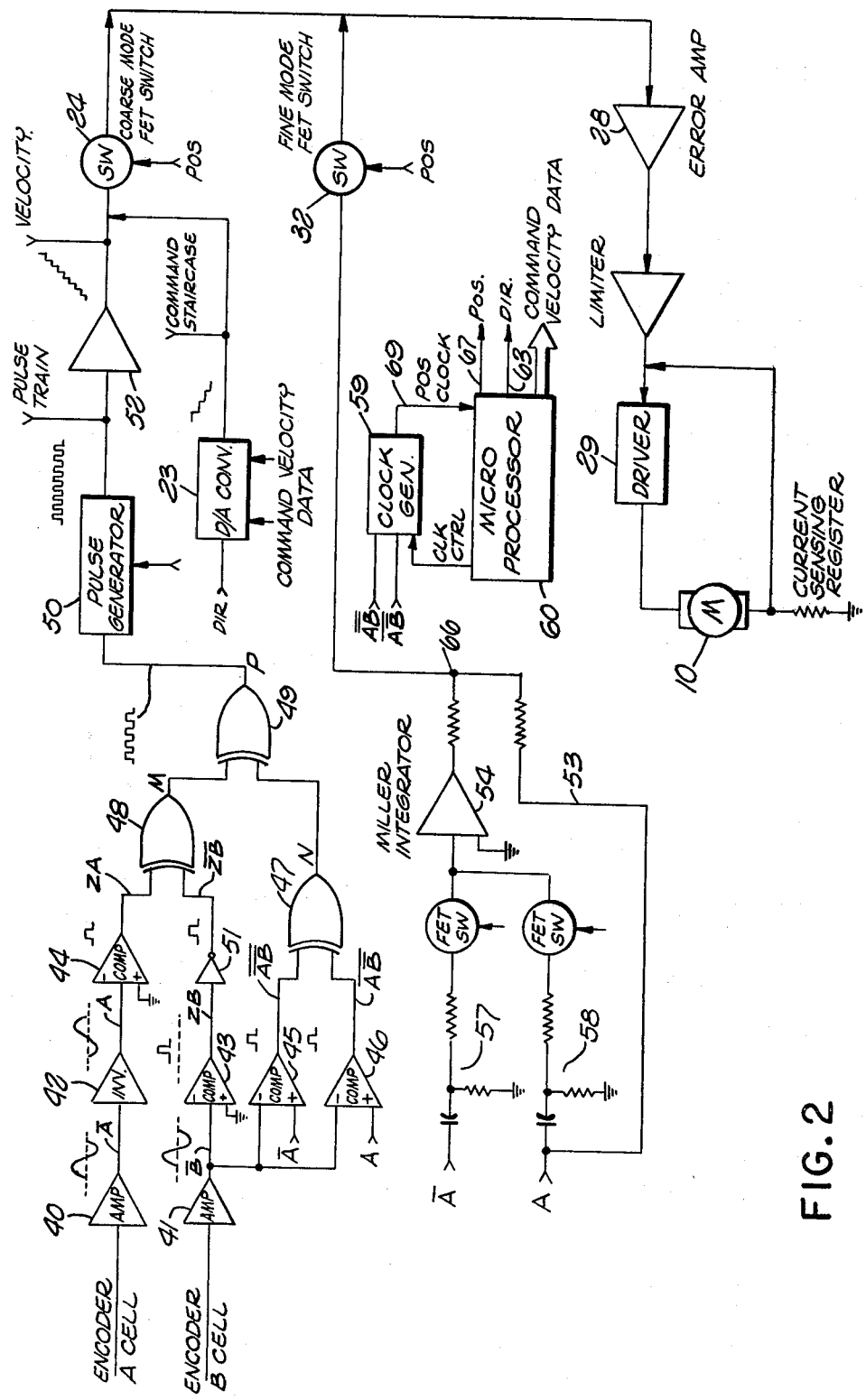
FIG. 2 is a block diagram of a digital servo system embodying the present invention.

Turning now to FIG. 2, there is depicted a block diagram of a closed loop servo system employing the present invention. The signals from the position encoder are amplified in operational amplifiers 40 and 41 to produce $\overline{A}$ and $\overline{B}$ signals. One of these signals, in this case the $\overline{A}$ signal, is inverted by an inverting operational amplifier 42 to produce an A signal. The A and $\overline{B}$ signals are compared with ground potential in comparators 43 and 44 which output a digital signal whenever the input is negative. These digital signals are referred to as $\overline{ZA}$ and ZB, respectively. The ZB signal is inverted by inverter 51 to produce $\overline{ZB}$.

Referring now briefly to FIG. 4, there is depicted a timing diagram showing the various signals produced by our digital servo during 360 degrees of phase change in the sinusoidal position signals from the position encoder. The sinudoidal position signals, A, B, $\overline{A}$ and $\overline{B}$ are shown at the top of FIG. 4. As will be seen, only three of these signals need to be generated. In the embodiment of FIG. 2, the B signal is not generated; however, all position signals are shown in FIG. 4 to help better understand the timing considerations. The sinusoidal position signals are shown through a 360 degree phase change which corresponds to a small incremental amount of movement in the controlled element, such as the print wheel, the carriage or the magnetic pickup, as previously mentioned. As can be seen, the A and B signals are displaced by 90 degrees in phase and signal B leads signal A by 90 degrees which in turn leads signal $\overline{B}$ by 90 degrees which further in turn leads signal $\overline{A}$ by 90 degrees. The A signal would lead if the direction of motion were reversed. The $\overline{ZA}$ and $\overline{ZB}$ digital signals go high when their corresponding sinusoidal position signal goes low.

Returning to FIG. 2, the $\overline{B}$ signal is compared with the $\overline{A}$ signal in a comparator 45 and with the A signal in a comparator 46. Comparators 45 and 46 go high when the $\overline{B}$ signal is negative compared to the respective A or $\overline{A}$ signal. The outputs of comparators 45 and 46 are applied to an exclusive OR gate 47. The output of exclusive OR gate 47, that is signal N, as well as the outputs of comparators 45 and 46, signals $\overline{AB}$ and $A\overline{B}$, are depicted in FIG. 4.

The output of comparator 43 is applied via inverter 51 to an input of exclusive OR gate 48 along with the output of comparator 44. The output of exclusive OR gate 48, that is signal M, is also depicted at FIG. 4. It should be noted at this point that the M and N signals from exclusive OR gates 48 and 47, respectively, change state four times during each 360 degrees phase change in the analog position signal. Moreover, signals M and N change state accurately with the phase change in the analog position signal. That is, considering the A and B analog position signals, it should be noted that the M signal changes state at each zero crossing of either of the A or B analog position signals while the N signal changes state as the A, B, $\overline{A}$ and $\overline{B}$ signals cross each other off axis.

The M and N signals are applied to another exclusive OR gate 49, which produces a P signal which is also shown at FIG. 4. The P signal, as can be seen, changes state eight times during the 360 degrees phase change in the analog position signal and therefore more accurately represents the changing position of the movable object controlled by the servo system, whether it be a daisywheel printhead, the printer carriage, the magnetic pickup or other movable object, than either the M or N signals would do individually. The P signal is preferably applied to a constant amplitude and pulse width phase generator 50 for producing a relatively narrow pulse in response to each polarity change occuring in the P singal. Since the P signal changes state eight times for a 360 degree phase change in the analog position signal, the output of generator 50 provides a pulse train of eight pulses for such change in the analog position signal. The pulse train has individual pulses of uniform height and duration with leading edges occuring in time with each relative 45 degrees of phase change in the analog position signal. The output of generator 50 is applied via a Miller integrator 52 and electronic switch 24 to error amplifier 28. Also applied to error amplifier 28 via switch 24 is a command velocity from D to A converter 23. D to A converter 23, switch 24 and error amplifier 28 are preferably equivalent to those respective elements discussed with respect to FIG. 1. Switch 24 is preferably closed when in the coarse mode of operation and opened in the fine mode of operation. It should be noted, of course, that the aforedescribed components may be used in a servo having only a single mode of operation, if desired.

In the fine mode of operation (if used, of course), a switch 32 is closed which couples the A position signal via line 53 to error amplifier 28 as well as a velocity signal from integrator 54. Integrator 54 is responsive to the A and $\overline{A}$ signals coupled via RC circuits 57 and 58 respectively to electronic switches 55 and 56, respectively. Electronic switches 55 and 56 are controlled by the $\overline{ZB}$ and ZB signals outputted from inverter 51 and comparator 43, respectively. Electronic switches 24, 32, 55 and 56 are preferably provided by field effect transistors.

Also shown in FIG. 2 is a microprocessor 60 which is appropriately programmed to supply command velocity data to D to A converter 23. Thus, microprocessor 60 fulfills the functions attributed to the delta counter 21 and velocity control ROM 22 of FIG. 1 by maintaining the delta count and looking up the command velocity based on the delta count. The command velocity profile is preferably stored in a ROM associated with microprocessor 60. Microprocessor 60 also outputs the position signal POS (i.e., $\Delta=0$) for controlling switches 24, 32 as well as a direction signal DIR indicative of direction which the controlled object is to move. A clock generator 59 generates a position clock signal for decrementing the delta count maintained in microprocessor 60. Clock generator 59, as will be see, is arranged to count on either $A\overline{B}$ or $\overline{AB}$ signals according to the direction of movement and the mode of operation.

Figure 3A:
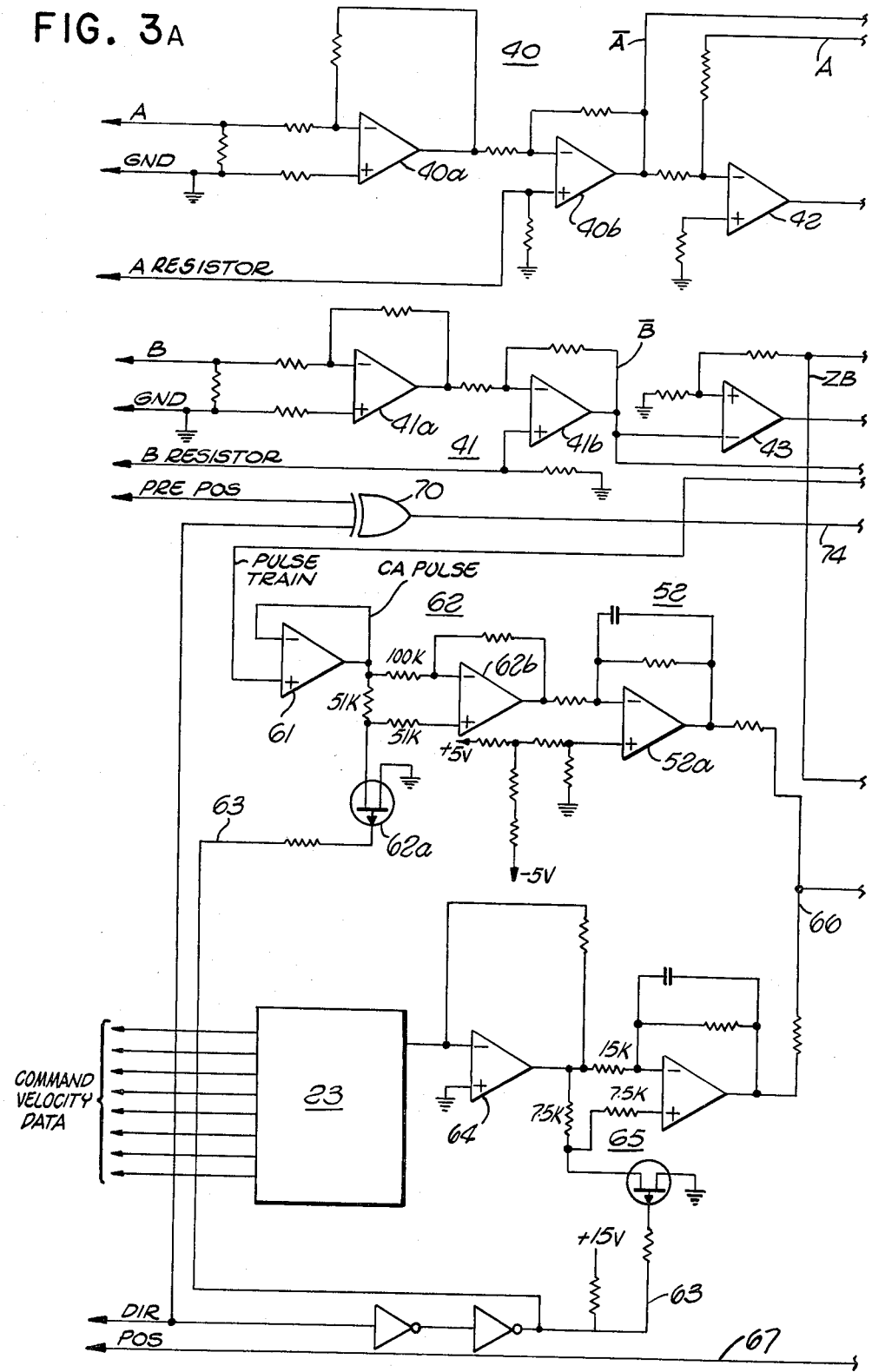
FIGS. 3(a)-3(c) form a logic diagram of the digital servo system.
Figure 3B:
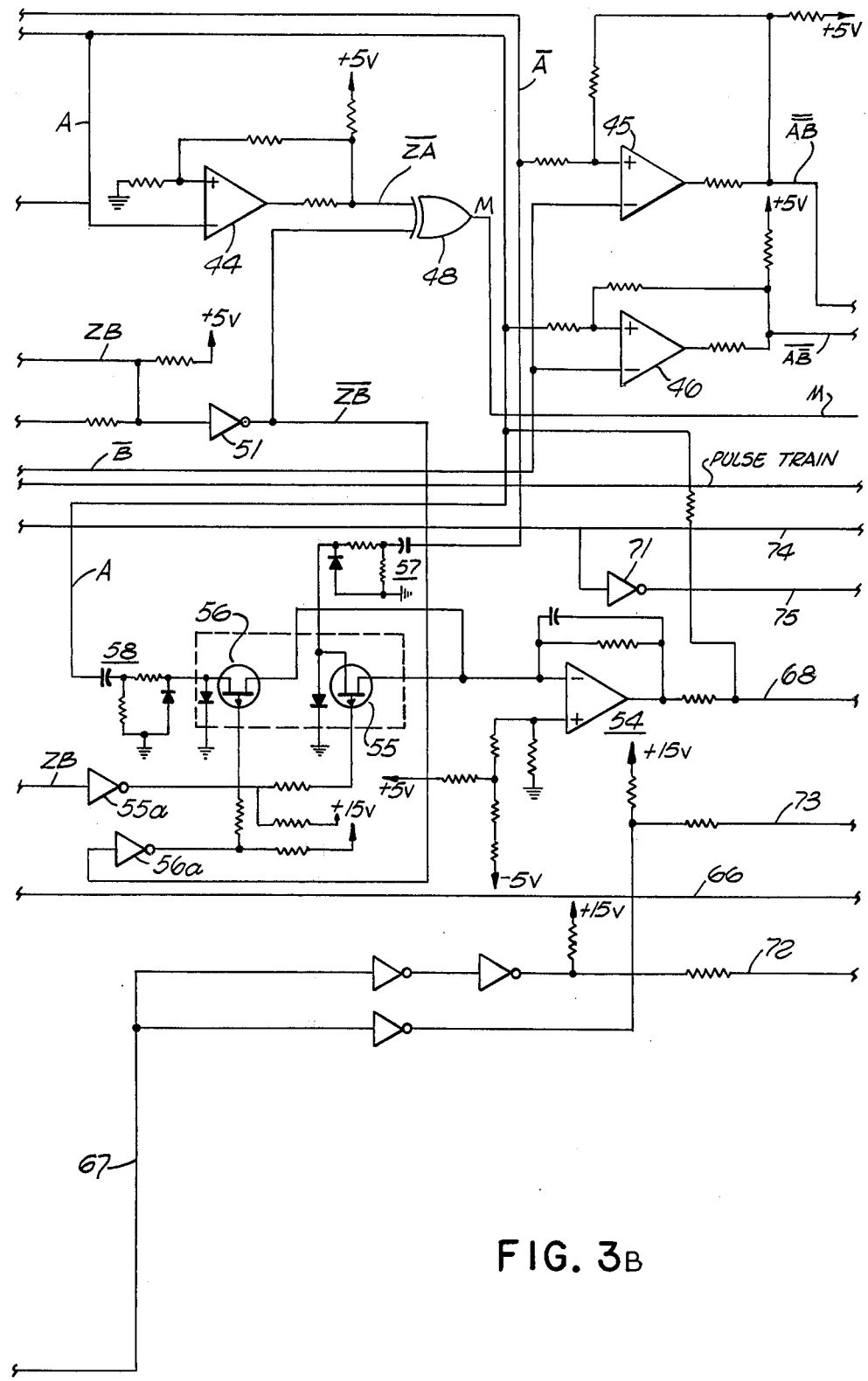
Figure 3C:
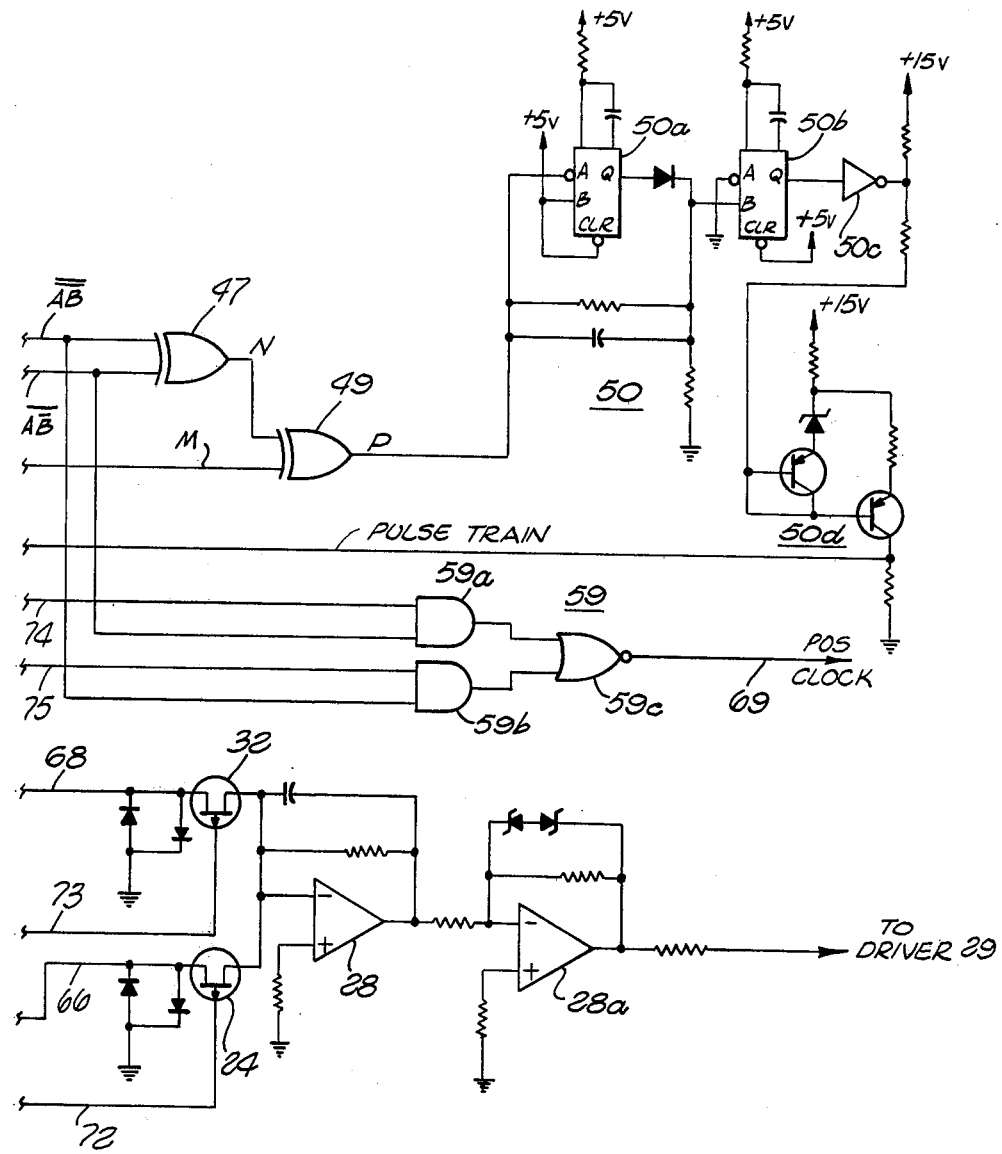

FIG. 3(a)-3(c) form a detailed logic diagram of our digital servo when arranged to form a complete schematic by properly placing these figures adjacent to each other. The inputs from the encoder are the A, B, Ground, A Resistor and B Resistor inputs. The A Resistor and B Resistor inputs are from compensation resistors installed on the encoder during manufacture. The A and B inputs are applied to amplifiers 40 and 41 which preferably comprises pairs of operational amplifiers 40a and 40b and 41a and 41b, respectively. Preferred device types for the operational amplifiers and analog comparators depicted on FIGS. 3(a)-3(c) are listed in Table I.

The output of operational amplifier 40b, signal $\overline{A}$, is applied via an inverting operational amplifier 42 to generate the $\overline{A}$ signal which is in turn applied to a comparator 44, a comparator 46, a FET 32 and a FET 56b. The A signal is also applied to a comparator 45 and a FET 55b. The output of comparator 44, that is signal $\overline{ZA}$, is applied to an exclusive OR gate 48. The output of operational amplifier 41b, that is the $\overline{B}$ signal, is applied to a comparator 43, comparator 46 and comparator 45. The output of comparator 43, that is signal ZB, is applied to an inverter 51 and to the gate of a FET 55b via an inverter 55a. The output of inverter 51, that is the $\overline{ZB}$ signal, is applied as the other input to exclusive OR gate 48 and via an inverter 56a to the gate of a FET 56b. The output of exclusive OR gate 48 is the signal M previously described with respect to FIGS. 2 and 4. The output of comparator 45 is the $\overline{AB}$ signal while the output of comparator 46 is the $A\overline{B}$ signal, both of which were previously described with respect to FIGS. 2 and 4. The outputs of comparators 45 and 46 are applied to exclusive OR gate 47 as well as to a clock generator circuit 59. The output of exclusive OR gate 47 is, of course, the N signal previously described with respect to FIGS. 2 and 4. The N signal is applied along with the M signal (from exclusive OR gate 48) to exclusive OR gate 49. The output of exclusive OR gate 49 is the previously described P signal which changes state eight times during 360 degrees of phase change in the analog position signal. The output of exclusive OR gate 49 is preferably applied via a pair of one-shots 50a and 50b which are in turn coupled via an inverter 50c and a constant current generator 50d to an operational amplifier 61. One-shots 50a and 50b produce pulses having a ten microsecond width.

Operational amplifier 61 serves as a buffer amplifier. The output from buffer 61, that is signal CA Pulse, is depicted on FIG. 4 where a pulse occurs for each change of state in the P signal. The output of operational amplifier 61 is applied to a circuit 62 including an FET 62a and an operational amplifier 62b for selectively inverting the output of buffer 61 according to the direction which the controlled object is to move. The direction is indicated by the state of the DIR signal on line 63 which is obtained from microprocessor 60 (FIG. 2). The output of circuit 62 is applied to Miller integrator circuit 52 which comprises an operational amplifier 52a with capacitive feedback. The Miller integrator has a dynamic range of 0–100 kHz in this embodiment since the expected maximum pulse rate is 50 to 60 kHz for the pulse train. The velocity signal outputted from integrator 52 is depicted on FIG. 4. The command velocity output from D to A converter 23 appears at node 66. The output of D to A converter 23 is coupled to node 66 via an operational buffer amplifier 64 and a circuit 65 which changes the polarity of the output from buffer amplifier 64 according to the state of the DIR signal on line 63. Node 66 is coupled to error amplifier 28 via FET 24 whose gate is controlled by the POS signal on line 67. The POS signal, as aforementioned, is derived from microprocessor 60 and changes state when the servo system changes from the coarse mode to the fine mode of operation and vice versa.

The signal at node 66 controls the operational servo mechanism during its coarse (velocity) mode of operation. In the fine (position) mode of operation, the signal at node 68 controls the operation of the servo mechanisms, node 68 being coupled to the input of error amplifier 28 via FET 32. The signal at node 68 is the A signal summed with a velocity signal from a Miller intergrator 54. Integrator 54 is responsive to the A and A signals coupled via FET's 56 and 55, respectively, and RC circuits 58 and 57, respectively. FET's 55 and 56 are coupled to signals ZB and $\overline{ZB}$ via inverters 55a and 56a, respectively. The output of the error amplifier 28 is applied via a limiter 28a to driver amplifier 29 (FIG. 2).

The clock generator 59 selectively applies the $\overline{AB}$ or $\overline{\overline{AB}}$ signals as the clock signals to the microprocessor 60 on line 69 depending upon the states of the Preposition signal (PRE POS) and the DIR signal. As aforementioned, the state of the DIR signal indicates the direction of movement of the controlled element while, as will be seen, PRE POS is generated approximately 90 degrees before the POS signal in terms of phase change in the analog position signal. The PRE POS and the DIR signals are applied to an exclusive OR gate 70. The output of exclusive OR gate 70 on line 74 is applied to an AND gate 59a along with the $\overline{AB}$ signal and via inverter 71 to an AND gate 59b along with signal $\overline{\overline{AB}}$. The outputs of AND gates 59a and 59b are applied to a NOR gate 59c whose output is the clock signal on line 69. This clock signal is applied to microprocessor 60 for the purpose of decrementing the delta count maintained thereby. For the direction of movement shown in FIG. 4, microprocessor 60 generates $\overline{\text{PRE POS}}$ at the next to last count (but during the final 360 degrees of analog position signal phase change to the commanded at rest position). The microprocessor 60 then tests for the occurance of $\overline{AB}$ and thereupon decrements the delta count to zero and generates $\overline{\text{POS}}$. The timing relationship between $\overline{AB}$, $\overline{\overline{AB}}$, $\overline{\text{POS}}$ AND $\overline{\text{PRE POS}}$ are shown in FIG. 4 for one direction of movement during the last incremental amount of movement. If the movable member were moving in the other direction, the delta count would initially be decremented on $\overline{AB}$ and finally decremented to zero on $\overline{\overline{AB}}$ when $\overline{\text{PRE POS}}$ went low. For this reason, clock generator is responsive to $\overline{\text{DIR}}$ to control which signal $\overline{AB}$ or $\overline{\overline{AB}}$ is used to initially decrement the delta counter and to $\overline{\text{PRE POS}}$ to finally decrement the delta counter to zero on the signal $\overline{AB}$ or $\overline{\overline{AB}}$ not used initially. The creation of two clock cycles during the final incremental amount of movement permits smoother generation of the command velocity by Microprocessor 60 or ROM 22 (and the delta counter) during the critical stage of movement just prior to entering the fine mode of operation when the servo electronically detents on the zero crossing of the A signal.

Having described the invention in connection with certain embodiments, modification will now suggest itself to those skilled in the art. It is to be understood that this invention is not limited to the specific embodiments disclosed, except as set forth in the appended claims.

TABLE I

| DEVICE | MANUFACTURER | DEVICE TYPE NO. |
|---|---|---|
| Operational Amplifiers 28,28a,40a,40b,41a,41b, 42,52a,54,61,62a,64 and 65 | Texas Instruments | MC 3403N |
| Comparators 43,44,45 and 46 | Signetics | LM 339N |

What is claimed:

1. In a servo system for controlling the motion of a movable member along a path from a starting position to a destination position, said member being positioned by a motor and being coupled to means for generating at least two space phase cyclic analog position signals representative of the instantaneous position of said movable member, the periods of said signals being indicative of the instantaneous velocity of said movable member, the improvement comprising means responsive to said two position signals for generating a digital pulse train having a pulse rate indicative of the instantaneous velocity of said member, said means for generating a digital pulse train comprising first, second and third exclusive OR gates, the outputs of the first and second providing inputs to the third exclusive OR gate, the first exclusive OR gate being responsive to digital signals indicating the polarity of said analog portion signals and the second exclusive OR gate being responsive to digital signals indicating the relative polarity between said analog signals and an inverted one of said analog portion signals, means for integrating said digital pulse train to obtain an analog voltage representative of the pulse rate of said pulse train and control means responsive to said analog voltage for controlling the motion of said motor.

2. In a servo system for controlling the motion of a movable member along a path from a starting position to a destination position, said member being positioned by a motor and being coupled to means for generating at least two space phase cyclic analog position signals representative of the instantaneous position of said movable member, the periods of said signals being indicative of the instantaneous velocity of said movable member, the improvement comprising means responsive to said two position signals for generating a digital pulse train having a pulse rate indicative of the instantaneous velocity of said member, said means for generating said digital pulse train including a one shot pulse generator and a constant current generator, said constant current generator being driven by said one shot pulse generator, and means for integrating the output of said constant current generator to obtain an analog voltage representative of the pulse rate of said pulse train and control means responsive to said analog voltage for controlling the motion of said motor.

3. The servo system according to claim 2, wherein a pulse occurs in said pulse train at least four times during each cycle of one of said position signals.

4. The servo system according to claim 3, wherein said control means is responsive to at least one of said analog position signals for accurately positioning said movable member during a fine mode of operation, said fine mode occurring during a final portion of the movement to said destination position and wherein said control means is responsive to said analog voltage and to a command velocity signal during a coarse mode of operation preceeding said fine mode.

5. A servo system for controlling the motion of a movable member, said system comprising:
 (a) means for generating first and second cyclic signals in response to movement of said member;
 (b) first comparator means for generating a first digital signal having one state when said first cyclic signal is more positive than said second cyclic signal and another state when said first cyclic signal is more negative than said second cyclic signal;
 (c) means for inverting one of said cyclic signals;
 (d) second comparator means for generating a second digital signal having one state when the inverted one of said cyclic signals is more positive than the other of said cyclic signals and another state when the inverted one of said cyclic signals is more negative than the other of said cyclic signals;

(e) first digitizing means for generating a third digital signal having one state when said first cyclic signal is positive and having another state when said first cyclic signal is negative;

(f) second digitizing means for generating a fourth digital signal having one state when said second cyclic signal is positive and having another state when said second cyclic signal is negative;

(g) means for generating a fifth digital signal having one state when said third and fourth digital signals are of the same state and having another state when said third and fourth digital signals are of different states;

(h) means for generating a sixth digital signal having one state when said first and second digital signals are of the same state and another state when said first and second digital signals are of different states;

(i) means for generating a seventh digital signal having one state when said fifth and sixth digital signals are of the same state and having another state when said fifth and sixth digital signals are of different states;

(j) means responsive to the occurrence of a change in state of said seventh digital signal for generating a velocity signal;

(k) means for generating a velocity command signal;

(l) error signal generator means responsive to said velocity signal and said velocity command signal; and (m) means for driving said member in accordance with output from said error signal generator means.

6. The servo system according to claim 5, wherein said means responsive to the occurrance of a change of state of said seventh digital signal includes an integrator.

7. The servo system according to claim 5, wherein said means responsive to the occurrance of a change in state of said seventh digital signal includes at least one one-shot circuit for generating a pulse upon the occurance of each change in state of said seventh digital signal.

8. The servo system according to claim 7, wherein said means responsive to the occurrance of a change in state of said seventh digital signal further includes a constant current source driven by said at least one one-shot for assuring that the pulse train generated thereby has an accurate pulse height.

9. The servo system according to claim 8, wherein said means responsive to the occurrance of a change in state of said seventh digital signal further includes an integrater coupled to the output of said constant current source.

10. The servo system as in claim 5, wherein said system is adapted for moving the movable member from an at rest starting position to an at rest destination position and includes means for differentiating one of said cyclic signals and wherein the error signal generator means is responsive to said velocity signal and said velocity command signal during a coarse mode of operation, said error signal generator means being responsive to the output of said means for differentiating said one of said cyclic signals and being further responsive to said one of said cyclic signals during a fine mode of operation said fine mode of operation occurring subsequent to said coarse mode of operation as said movable member comes to said at rest destination position.

11. In a servo system for controlling the motion of a movable member along a path from a starting position to a destination position, said member being positioned by a motor and being coupled to means for generating a pair of phase cyclic analog position signals representative of the instantaneous position of said movable member, the periods of said signals being indicative of the instantaneous velocity of said movable member, the improvement comprising first means responsive to one of said position signals for generating a first digital pulse train having a pulse rate related to the instantaneous velocity of said member, second means responsive to the other of said position signals for generating a second digital pulse train having a pulse train related to the instantaneous velocity of said member, a logic element responsive to said first and second digital pulse trains for generating a third digital pulse train having a pulse rate greater than either of said first or second pulse rates, and means for integrating said third digital pulse train to obtain an analog voltage representative of the pulse rate of said third pulse train and control means responsive to said analog voltage for controlling the motion of said motor.

12. The servo system according to claim 11 wherein said logic element comprises an exclusive OR circuit.

13. The servo system according to claim 11 further including and error amplifier responsive to said analog voltage and a command velocity output generated by a microprocessor, the error amplifier generating a signal representing the difference therebetween.

14. The servo system as defined in claim 13 wherein said system is adapted for moving the movable member from an at rest starting position to an at rest destination position wherein said error amplifier is responsive to said velocity signal and said velocity command signal during a coarse mode of operation, said error amplifier being further responsive to one of said cyclic signals during a fine mode of operation, said fine mode of operation occurring subsequent to said coarse mode of operation as said movable member comes to said at rest destination position, and further including clock means coupled to said microprocessor for determining when said system goes from the coarse to fine mode of operation, one of two signals being applied as input to said clock means dependent upon the direction of movement of said member.

* * * * *